United States Patent
Zimmer (10) Patent No.: US 12,547,127 B2
(45) Date of Patent: Feb. 10, 2026

(54) METHOD FOR TRAINING A MACHINE LEARNING ALGORITHM

(71) Applicant: Robert Bosch GmbH, Stuttgart (DE)

(72) Inventor: Christoph Zimmer, Korntal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 910 days.

(21) Appl. No.: 17/841,816

(22) Filed: Jun. 16, 2022

(65) Prior Publication Data

US 2022/0404780 A1    Dec. 22, 2022

(30) Foreign Application Priority Data

Jun. 22, 2021    (DE) .................. 10 2021 206 375.6

(51) Int. Cl.
    *G05B 13/02*    (2006.01)
(52) U.S. Cl.
    CPC ............................ *G05B 13/0265* (2013.01)
(58) Field of Classification Search
    CPC .... G05B 13/04; G05B 13/041; G05B 13/042; G05B 13/047; G05B 13/0265; G06N 3/091
    See application file for complete search history.

(56) References Cited

FOREIGN PATENT DOCUMENTS

DE    102016216945 A1    3/2018

OTHER PUBLICATIONS

Berkenkamp F, Schoellig AP, Krause A. Safe controller optimization for quadrotors with Gaussian processes. In2016 IEEE international conference on robotics and automation (ICRA) May 16, 2016 (pp. 491-496). IEEE. (Year: 2016).*

Feng D, Wei X, Rosenbaum L, Maki A, Dietmayer K. Deep active learning for efficient training of a lidar 3d object detector. In2019 IEEE Intelligent Vehicles Symposium (IV) Jun. 9, 2019 (pp. 667-674). IEEE. (Year: 2019).*

Jose Manuel Pena et al. "Dimensionality Reduction in Unsupervised Learning of Conditional Gaussian Networks" IEEE Transactions on Pattern Analysis and Machine Itelligence, vol. 23, No. 6, Jun. 2001. 14 Pages.

(Continued)

*Primary Examiner* — Schyler S Sanks
(74) *Attorney, Agent, or Firm* — NORTON ROSE FULBRIGHT US LLP (57) ABSTRACT

A method for training a machine learning algorithm including uncertainties. The method includes the following steps: for each point in time of the plurality of points in time, determining in each case an influence, which the data detected at the corresponding point in time have on uncertainties instantaneously contained in the initial model, for each point in time of the plurality of points in time, determining a resolution of the corresponding detected data based on an established data level and on the respective influence, which the corresponding data have on uncertainties instantaneously contained in the initial model, for each point in time of the plurality of points in time, transferring the detected data to the control unit based on the corresponding determined resolution, and retraining of the initial model by the control unit based on the data transferred to the control unit.

14 Claims, 2 Drawing Sheets

(56) References Cited

OTHER PUBLICATIONS

Zebari, Rizgar et al. "A Comprehensive REviwe of Dimensionality Reduction Techniques for Feature Selection and Feature Extraction" Journal of Applied Science and Technology Trends, May 2020. 16 Pages.

Batsch, Felix et al. "Performance Boundary Identification for the Evaluation of Automated Vehicles using Gaussian Process Classification" arXiv:1907.05364. 6 Pages.

* cited by examiner

Fig. 1

METHOD FOR TRAINING A MACHINE LEARNING ALGORITHM

FIELD

The present invention relates to a method for training a machine learning algorithm for controlling at least one controllable system, the at least one controllable system being trained based on a machine learning algorithm including uncertainties, the machine learning algorithm being capable of being retrained during an operation of the at least one controllable system, and a transfer of training data to a control unit for retraining the machine learning algorithm being optimized.

BACKGROUND INFORMATION

Digital control units are used in numerous applications for controlling and regulating technical systems, which are referred to below in general as controllable systems. The control units in this case process sensor signals or other input values according to a predefined control algorithm, so that one or multiple output values is/are ascertained for functions, for example, actuating variables for the activation of positioning elements.

The control algorithm may, for example, be a machine learning algorithm. In this case, individual controllable systems each collect data about their use, these data subsequently being used to train the machine learning algorithm accordingly. In general such machine learning algorithms are based on the fact that statistical methods are used in order to train a data processing system in such a way that the latter is able to carry out a particular task without it having been originally programed explicitly for this purpose. The aim of machine learning in this case is to construct algorithms, which are able to learn from data and to make predictions. These algorithms create mathematical models, with which, for example, data may be classified.

In this case, in conventional methods, the algorithm is first pre-trained on initially collected data in order to obtain an initial model, which includes uncertainties. This has the advantage that the machine learning algorithm in this case may already be relatively quickly used for controlling the at least one controllable system, without initially all possible assignments, in particular, even rarely occurring assignments, having to be laboriously exactly trained. During the operation of the at least one controllable system, the machine learning algorithm or the initial model may then be retrained based on corresponding data detected during the operation of the at least one controllable system in order to eliminate uncertainties.

In this connection, however, it is shown to be problematical that controllable systems increasingly include a plurality of functions and/or corresponding actuators to be controlled. If, during the operation of the controllable system, data relating to all of these functions to be controlled were now detected and thus a plurality of data or a large volume of data were to be transferred to a corresponding control unit for retraining the machine learning algorithm, this may, however, result in problems during the data transfer, for example, in latencies or interaction effects such as interferences.

A method for carrying out a function based on a model value of a data-based function model is described in German Patent Application No. DE 10 2016 216 945 A1, where a model value of a data-based function model is ascertained at a query point, a model accuracy indication or a model validity indication, which indicates the accuracy or the validity of the model value of the data-based function model at the query point, and the function is carried out as a function of the model accuracy indication or model validity indication.

SUMMARY

An object of the present invention therefore is to specify an optimized method for training a machine learning algorithm and, in particular, an optimized method for retraining a machine learning algorithm including uncertainties.

This object is may be achieved with a method for training a machine learning algorithm according to the present invention.

The object may further be achieved with a control unit including the features of the present invention.

The object may further also be achieved by a system for training a machine learning algorithm according to the present invention.

Advantageous specific embodiments and refinements result from the disclosure herein.

According to one specific example embodiment of the present invention, this object may be achieved by a method for training a machine learning algorithm, the machine learning algorithm being an algorithm for controlling at least one controllable system, the machine learning algorithm assigning possible output values to input values, the machine learning algorithm including for each assignment of an input value to an output value an uncertainty, the uncertainty indicating in each case how well the assignment of the input value to the possible output value has been previously trained. The method in this case includes a pre-training of the machine learning algorithm based on data initially collected by a control unit for training the machine learning algorithm, in order to obtain an initial model. Furthermore, data are detected at a plurality of points in time during an operation of the at least one controllable system, which characterize an instantaneous state of the at least one controllable system, for each point in time of the plurality of points in time, an influence, which the data detected at the corresponding point in time have on uncertainties instantaneously contained in the initial model is determined in each case, and for each point in time of the plurality of points in time, a resolution of the data detected at the corresponding point in time is determined based on an established data level and on the respective influence that the data detected at the corresponding point in time have on uncertainties instantaneously contained in the initial model, for each point in time of the plurality of points in time, the data detected at the corresponding point in time based on or with the corresponding determined resolution being transferred to the control unit and the initial model being retrained by the control unit based on the data transferred to the control unit.

Uncertainty is understood hereby to mean a value or a variable, which indicates the quality of the assignment between the input value and the corresponding output value, i.e., on how much information content this assignment is based or how many training data have previously been received close to the assignment.

Initially collected data are understood to mean further data or training data, which are initially available for training the machine learning algorithm, it being, in particular, data that describe frequent or regularly occurring situations. The machine learning algorithm trained on these initially collected data is referred to in this case as an initial model.

Influence, which the data detected at a particular point in time have on the uncertainties instantaneously contained in the initial model, is understood to mean an information content of the corresponding data, the information content indicating to what extent these data are relevant for the retraining of the initial model, i.e., whether or to what extent uncertainties in the initial model may be reduced by a retraining of the initial model based on these data. Instantaneously contained uncertainties in this case refer to uncertainties contained in the potentially already retrained initial model at a particular point in time.

Furthermore, resolution is understood to mean the accuracy with which the detected data are transferred to the control unit and displayed or imaged. For example, the resolution may indicate with which quality detected image data or how many pixels of the detected image data are transferred. In the case of dynamic measurements, the resolution may further indicate, for example, at which points in time detected data are transferred to the control unit. The resolution in this case in turn also influences the memory size of the corresponding data.

Furthermore, the established data level refers to a defined level of pieces of information in the data transferred to the control unit, for example, a maximum volume of data to be transferred or how high the information content in the transferred data overall should at least be. The established data level in this case may be predefined, for example, by a model manufacturer or by a manufacturer of the at least one controllable system or by an operator of the control unit or of a corresponding data center.

Thus, the resolution and thus the memory size of the detected data on the whole may be adapted in such a way that the detected data are not transmitted in their full resolution or memory size. In this way, it is possible to prevent problems during the data transfer, for example, latencies or interaction effects such as interferences. The data transfer may further be designed in such a way that conditions of a corresponding data transfer system, for example, capacitances of a CAN bus or available bandwidths of a wireless data transfer are taken into consideration. In addition, the method ensures a dynamic refining or active learning of the algorithm where, based on the fact that the transferred data simultaneously also include a desired information content, very rare situations even in practice may be trained. As a result, the accuracy in the assigning of input values to output values may further be increased by the machine learning algorithm. Thus, on the whole, an optimized method for training a machine learning algorithm and, in particular, an optimized method for retraining a machine learning algorithm including uncertainties are specified.

The at least controllable system in this case may, for example, be driver assistance functions of an autonomously driving vehicle, which include functions relating to the autonomously driving motor vehicle, for example, gear selection, speed selection or temperature setting. The at least one controllable system may further, however, also be, for example, any further controllable system based on a machine learning algorithm, for example, a kitchen appliance or a washing machine.

The individual points in time may further be distributed equidistantly over time, for example. Further, however, other distributions are also possible.

The input value may further be a sensor signal, for example. The input value may, however, further also be predefined by a user, for example. An output value characterizes a corresponding activation signal for controlling the at least one controllable system, or a value at which the at least one controllable system is set.

In one specific embodiment of the present invention, the initial model in this case is a Gaussian process.

A Gaussian process is understood in this case to mean a stochastic process, in which each finite subset of random variables is normally distributed (Gaussian-distributed) in a multi-dimensional manner. Generally speaking, a Gaussian process represents temporal, spatial or arbitrary other functions, whose functional values are able to be modelled only with particular uncertainties and probabilities due to incomplete information.

Such a Gaussian process is therefore suitable for obtaining or training the initial model in a quick and simple manner.

The initial model may further, however, also be any other machine learning algorithm including uncertainties, for example, a Bayesian neural network.

The established data level in this case may indicate how great the influence of the data transferred to the control unit should at least be on uncertainties instantaneously contained in the initial model, i.e., how large the information content desired for retraining the initial model should at least be in the transferred data. The establish data level may, in particular, be established in such a way that uncertainties in the algorithm of the machine learning algorithm or in the initial model are preferably quickly reduced, as a result of which computing time and corresponding resources required during the refining or retraining of the initial model may be reduced.

In this case, the step of determining for each point in time of the plurality of points in time a resolution of the data detected at the corresponding point in time based on the established data level and on the respective influence which the data detected at the corresponding point in time have on uncertainties instantaneously contained in the initial model may include in each case a determining of the resolution in such a way that a memory size of the data to be transferred to the control unit is minimized and, at the same time, an information content of the data transferred to the control unit is at least as great as the magnitude of the influence that the data transferred to the control unit should at least have on uncertainties instantaneously contained in the initial model. Thus, a limited optimization method may be used for determining the corresponding resolution.

The resolution of the data may further be a spatial resolution, a planar resolution or a temporal resolution of the data.

Spatial resolution in this case is understood to mean the accuracy of the representation or transference of a three-dimensional plane.

Planar resolution is further understood to mean the accuracy of the representation or transference of a two-dimensional plane. In this case, situations are possible in which a left lower edge of a two-dimensional plane is resolved higher than a right upper edge.

Temporal resolution is further understood to mean at which points in time in the case of dynamic measurements detected data are transferred to the control unit.

With one further specific embodiment of the present invention, a method for controlling at least one controllable system is also specified, the method including a training of a machine learning algorithm for controlling the at least one controllable system by a method described above and a controlling of the at least one controllable system based on the trained machine learning algorithm.

Thus, on the whole, an optimized method for controlling at least one controllable system is specified, the at least one controllable system being controlled based on a machine learning algorithm, which has been trained based on an optimized method. Because an initial model is initially trained, the machine learning algorithm may thus be used already relatively quickly for controlling the at least one controllable system without initially all possible assignments, in particular, even rarely occurring assignments, having to be laboriously exactly trained. As a result, it is further possible to save computing time as well as corresponding computer capacities when training the machine learning algorithm, so that the method is able to be carried out, for example, by a control unit designed in the at least one controllable system itself, which normally includes fewer capacitances than a comparable control unit designed in a backend. In addition, the machine learning algorithm or the initial model may be retrained during the operation of the at least one controllable system, in order to reduce uncertainties in the initial model, the resolution and thus the memory size of the data to be transferred being adapted in such a way that the data to be transferred are not transferred with their full resolution or memory size. In this way, it is possible to prevent problems during the data transfer, for example, latencies or interaction effects such as interferences. The data transfer may further be designed in such a way that conditions of a corresponding data transfer system, for example, capacitances of a CAN bus or available bandwidths of a wireless data transfer are taken into consideration. In addition, the method ensures a dynamic refining or active learning of the algorithm, where very rare situations even in practice are able to be trained based on the selected transferred data. In this way the accuracy in assigning input values to output values when controlling the at least one controllable system may further be increased by the machine learning algorithm.

With one further specific embodiment of the present invention, a control unit is further provided for selecting training data for training a machine learning algorithm, the machine learning algorithm being an algorithm for controlling at least one controllable system, the machine learning algorithm assigning possible output values to input values, the machine learning algorithm including for each assignment of an input value to an output value an uncertainty, the uncertainty indicating in each case how well the assignment of the input value to the possible output value has previously been trained, and the machine learning algorithm having been pre-trained based on initially collected data, in order to obtain an initial model, and the control unit including a detection unit, which is designed to detect data at a plurality of points in time during an operation of the at least one controllable system, which characterizes in each case an instantaneous state of at least one controllable system, a first determination unit, which is designed, for each point in time of the plurality of points in time, to determine one influence each, which the data detected at the corresponding point in time have on uncertainties instantaneously contained in the initial model, a second determination unit, which is designed to determine a resolution of the data detected at the corresponding point in time based on an established data level and on the respective influence, which the data detected at the corresponding point in time have on the uncertainties instantaneously contained in the initial model, and a transfer unit, which is designed to transfer, for each point in time of the plurality of points in time, data detected at the corresponding point in time to a control unit for training the machine learning algorithm based on the or with the corresponding determined resolution.

Thus, on the whole, a control unit for transferring or for selecting training data for training a machine learning algorithm is specified, which is designed in such a way that the resolution and thus the memory size of the detected data are adapted in such a way that the detected data are not transferred in their full resolution or memory size. In this way, it is possible to prevent problems during the data transfer, for example, latencies or interaction effects such as interferences. The data transfer may further be designed in such a way that conditions of a corresponding data transfer system, for example, capacitances of a CAN bus or available bandwidths of a wireless data transfer are taken into consideration.

In one specific embodiment of the present invention, the initial model in this case is, in turn, a Gaussian process. Such a Gaussian process is suitable for obtaining or training the initial model in a quick and simple manner. The initial model may further, however, also be any other machine learning algorithm including uncertainties, for example, a Bayesian neural network.

The established data level in this case may in turn indicate how great the influence of the transferred data should at least be on uncertainties instantaneously contained in the initial model, i.e., how large the information content desired for retraining the initial model should at least be in the transferred data. The establish data level may, in particular, be established in such a way that uncertainties in the machine learning algorithm or in the initial model are preferably quickly reduced, as a result of which, computing time and corresponding resources required during the refining or retraining of the initial model may be reduced.

The second determination unit in this case may be designed to determine for each point in time of the plurality of points in time in each case the resolution of the data detected at the corresponding point in time in such a way that a memory size of the data transferred to the control unit is minimized and, at the same time, an information content of the data transferred to the control unit is at least as great as the magnitude of the influence that the data transferred to the control unit should at least have on uncertainties instantaneously contained in the initial model. Thus, the second determination unit may be designed to use in each case a limited optimization method for determining the corresponding resolution.

The resolution of the data may, in turn, further be a spatial resolution, a planar resolution or a temporal resolution of the data. Further, however, other types of resolution may also be used, for example, a radiometric resolution.

With one further specific embodiment of the present invention, a system for training a machine learning algorithm is also specified, the machine learning algorithm being an algorithm for controlling at least one controllable system, the machine learning algorithm assigning possible output values to input values, the machine learning algorithm including for each assignment of an input value to an output value an uncertainty, the uncertainty indicating in each case how well the assignment of the input value to the possible output value has previously been trained, and the system including a control unit described above for selecting training data for training the machine learning algorithm and a control unit for training the machine learning algorithm, the control unit for training the machine learning algorithm being designed to pre-train the machine learning algorithm based on initially collected data, in order to obtain an initial model, and to retrain the initial model based on data obtained by the control unit for selecting training data for training a machine learning algorithm for controlling a controllable system.

Thus, on the whole, an optimized system for training a machine learning algorithm and, in particular, an optimized system for retraining a machine learning algorithm including uncertainties is specified. The system in this case is designed in such a way that the resolution and thus the memory size of the detected data are adapted in such a way that the detected data are not transferred in their full resolution or memory size. In this way, it is possible to prevent problems during the data transfer, for example, latencies or interaction effects such as interferences. The data transfer may further be designed in such a way that conditions of a corresponding data transfer system, for example, capacitances of a CAN bus or available bandwidths of a wireless data transfer, are taken into consideration. In addition, the system ensures a dynamic refining or active learning of the algorithm, where very rare situations even in practice are able to be trained based on the selected transferred data. As a result, the accuracy in the assigning of input values to output values may further be increased by the machine learning algorithm.

With one further specific embodiment of the present invention, a system for controlling a controllable system is further also specified, the system including at least one controllable system and one control unit for controlling the at least one controllable system based on a machine learning algorithm trained by a method described above for training a machine learning algorithm.

Thus, on the whole, an optimized system for controlling at least one controllable system is specified, the at least one controllable system being controlled based on a machine learning algorithm, which has been trained based on an optimized method. Because an initial model is initially trained, the machine learning algorithm may thus be used already relatively quickly for controlling the at least one controllable system without initially all possible assignments, in particular, even rarely occurring assignments, having to be laboriously exactly trained. As a result, it is further possible to save computing time as well as corresponding computer capacities when training the machine learning algorithm. In addition, the machine learning algorithm or the initial model may be retrained during the operation of the at least one controllable system, in order to reduce uncertainties in the initial model, the resolution and thus the memory size of the data to be transferred being adapted in such a way that the detected data are not transferred in their full resolution or memory size. In this way, it is possible to prevent problems during the data transfer, for example, latencies or interaction effects such as interferences. The data transfer may further be designed in such a way that conditions of a corresponding data transfer system, for example, capacitances of a CAN bus or available bandwidths of a wireless data transfer are taken into consideration. In addition, the method ensures a dynamic refining or active learning of the algorithm, where very rare situations even in practice are able to be trained based on the selected transferred data. In this way, the accuracy in assigning input values to output values when controlling the at least one controllable system may further be increased by the machine learning algorithm.

The at least one controllable system in this case may be an autonomously driving motor vehicle, i.e., a system in which a plurality of controllable functions or controllable actuators, for example, for speed setting, gear selection or temperature regulation may be controlled simultaneously and independently of one another during operation. Further, however, the at least one controllable system may, for example, also be any further controllable system based on a machine learning algorithm, for example, a kitchen appliance or a washing machine.

Thus, on the whole, it should be noted that an optimized method for training a machine learning algorithm and, in particular, an optimized method for retraining a machine learning algorithm including uncertainties, are specified with the present invention.

The embodiments and further refinements described herein may be arbitrarily combined with one another.

Further possible embodiments, refinements and implementations of the present invention also include combinations not explicitly cited of features of the present invention described above or below with respect to the exemplary embodiments.

BRIEF DESCRIPTION OF THE DRAWINGS

The figures are intended to convey a further understanding of the specific embodiments of the present invention. They illustrate specific embodiments and serve to explain principles and concepts of the present invention in conjunction with the description.

Other specific embodiments and many of the cited advantages result with respect to the figures. The elements of the figures represented are not necessarily shown true to scale relative to one another.

DETAILED DESCRIPTION OF EXAMPLE EMBODIMENTS

In the figures, identical reference numerals denote identical or functionally identical elements, parts or components unless otherwise indicated.

Figure 1:
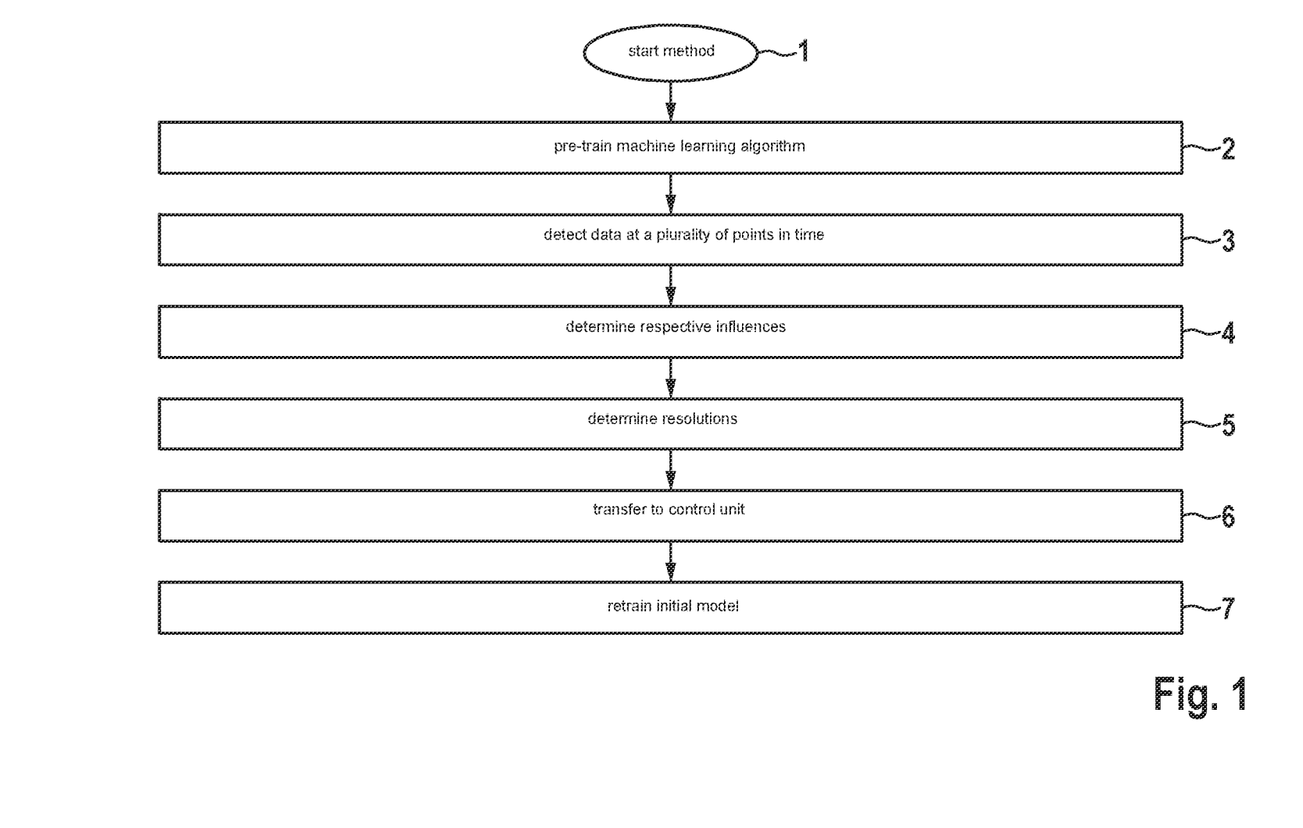
FIG. 1 shows a flowchart of a method for training a machine learning algorithm according to specific embodiments of the present invention.

FIG. 1 shows a flowchart of a method 1 for training a machine learning algorithm according to specific embodiments of the present invention.

Digital control units are used in numerous applications for controlling and regulating technical systems, which are referred to below in general as controllable systems. The control units in this case process sensor signals or other input values according to a predefined control algorithm, so that one or multiple output values is/are ascertained for functions, for example, actuating variables for the activation of positioning elements.

The control algorithm may, for example, be a machine learning algorithm. In this case, individual controllable systems each collect data about their use, these data subsequently being used to train the machine learning algorithm accordingly. In general, such machine learning algorithms in this case are based on the fact that statistical methods are used in order to train a data processing system in such a way that the latter is able to carry out a particular task without it having been originally programed explicitly for this purpose. The aim of machine learning in this case is to construct algorithms that are able to learn from data and to make predictions. These algorithms create mathematical models, with which, for example, data are able to be classified.

Methods are available in which the algorithm is first pre-trained on initially collected data in order to obtain an initial model, which includes uncertainties. This has the advantage that the machine learning algorithm in this case may already be relatively quickly used for controlling the at least one controllable system, without initially all possible assignments, in particular, even rarely occurring assignments, having to be laboriously exactly trained. As a result, it is further possible to save computing time as well as corresponding computer capacities when training the machine learning algorithm. During the operation of the at least one controllable system, the machine learning algorithm or the initial model may then be retrained based on corresponding data detected during the operation of the at least one controllable system in order to eliminate uncertainties.

In this connection, however, it is shown to be problematical, that controllable systems increasingly include a plurality of functions and/or corresponding actuators to be controlled. If, during the operation of the controllable system, data relating to all of these functions to be controlled were now detected and thus a plurality of data or a large volume of data were to be transferred to a corresponding control unit for retraining the machine learning algorithm, this may, however, result in problems during the data transfer, for example, in latencies or interaction effects such as interferences.

According to the specific embodiments of FIG. 1, a method 1 for training a machine learning algorithm is specified, the machine learning algorithm being an algorithm for controlling at least one controllable system, the machine learning algorithm assigning possible output values to input values, the machine learning algorithm including for each assignment of an input value to an output value an uncertainty, and the uncertainty indicating in each case how well the assignment of the input value to the possible output value has previously been trained. Method 1 in this case includes a step 2 of a pre-training of the machine learning algorithm based on data initially collected by a control unit for training the machine learning algorithm, in order to obtain an initial model. Further, in a subsequent step 3, data are detected at a plurality of points in time during an operation of the at least one controllable system, which characterize in each case an instantaneous state of the at least one controllable system, in a step 4 for each point in time of the plurality of points in time, an influence, which the data detected at the corresponding point in time have on the uncertainties instantaneously contained in the initial model is determined in each case and, in a step 5, for each point in time of the plurality of points in time, a resolution of the data detected at the corresponding point in time is determined in each case based on an established data level and on the respective influence, which the data detected at the corresponding point in time have on the uncertainties instantaneously contained in the initial model, in a following step 6, for each point in time of the plurality of points in time, the data detected at the corresponding point in time are transferred to the control unit based on the corresponding determined resolution and the initial model is subsequently retrained in a step 7 by the control unit based on the data transferred to the control unit.

Uncertainty is understood hereby to mean a value or a variable, which indicates the quality of the assignment between the input value and the corresponding output value, i.e., on how much information content this assignment is based or how many training data have previously been received close to the assignment.

Initially collected data are further understood to mean data or training data, which are initially available for training the machine learning algorithm, these being, in particular, data that describe frequented or regularly occurring situations. The machine learning algorithm trained on these initially collected data is referred to in this case as an initial model.

Influence, which the data detected at a particular point in time have on the uncertainties instantaneously contained in the initial model, is further understood to mean an information content of the corresponding data, the information content indicating to what extent these data are relevant for the retraining of the initial model, i.e., whether or to what extent uncertainties in the initial model may be reduced by a retraining of the initial model based on these data. Instantaneously contained uncertainties in this case refer to uncertainties contained in the potentially already retrained initial model at a particular point in time.

Resolution is further understood to mean the accuracy with which the detected data are transferred to the control unit and displayed or imaged. For example, the resolution may indicate how high qualitatively detected image data or how many pixels of the detected image data are transferred. In the case of dynamic measurements, the resolution may further indicate, for example, at which points in time detected data are transferred to the control unit. The resolution in this case, in turn, also influences the memory size of the corresponding data.

The established data level refers to a defined level of pieces of information in the data transferred to the control unit, for example, a maximum volume of data to be transferred or how high overall the information content in the transferred data should at least be. The established data level in this case may be predefined, for example, by a model manufacturer or by a manufacturer of the at least one controllable system or by an operator of the control unit or of a corresponding data center.

Thus, on the whole, the resolution and thus the memory size of the detected data are adapted in such a way that the detected data are not transmitted in their full resolution or memory size. In this way, it is possible to prevent problems during the data transfer, for example, latencies or interaction effects such as interferences. The data transfer may further be designed in such a way that conditions of a corresponding data transfer system, for example, capacitances of a CAN bus or available bandwidths of a wireless data transfer are taken into consideration. In addition, method 1 ensures a dynamic refining or active learning of the algorithm where, based on the fact that the transferred data simultaneously also include a desired information content, very rare situations even in practice are able to be trained. As a result, the accuracy in the assigning of input values to output values may further be increased by the machine learning algorithm. Thus, on the whole, an optimized method 1 for training a machine learning algorithm and, in particular, an optimized method 1 for retraining a machine learning algorithm including uncertainties are specified.

Method 1 in this case may be carried out repeatedly, for example, at particular time intervals, for example, every 10 minutes. The time intervals may further, however, also be adaptively adapted between individual repetitions of method 1. In this case a prediction model, in turn, may be used, which indicates which data are expected at certain points in time, where, based on this prediction model and, if necessary, its uncertainties, it may be decided at which point in time or after which period of time method 1 is carried out again.

In addition, the points in time of the plurality of points in time may be distributed equidistantly over time. As examples, the corresponding points in time may occur every second, every 10 seconds or every 30 seconds. Further, however, other distributions are also possible.

If the at least one controllable system includes a plurality of channels of data, for example, data from different controllable functions of the at least one controllable system, it is further possible to determine for each channel the same resolution or else also for at least one portion of the channels in each case a different or unique resolution.

Thus, on the whole, an information-optimal choice of which resolution of the data is to be transferred may be implemented based on method 1.

According to the specific embodiments of FIG. 1, the initial model in this case is a Gaussian process. A Gaussian process in this case refers to a multivariate normal distribution with correlations over a function. Gaussian processes are useful as methods in machine learning, since a Gaussian process including a covariance function, which controls its characteristic, may also be understood to mean a prior assumption about the properties of an unknown function. This prior assumption may be efficiently conditioned based on data, as a result of which a posteriori distribution is formed, which may be utilized for predicting unknown data points. Gaussian processes thus offer a complete Bayesian framework for inferring functions.

The uncertainty indication or quality indication, which is frequently also referred to as tolerance, may be determined in this case as the variance, in particular, the predictive variance of the Gaussian process.

In addition, the established data level indicates how great the influence of the transferred data should at least be on uncertainties instantaneously contained in the initial model, i.e., how great the information content in the transferred data should at least be for retraining the initial model.

The resolution in this case may be based in each case on a limited optimization problem. According to the specific embodiments of FIG. 1, step 5 of determining for each point in time of the plurality of points in time a resolution of the data detected at the corresponding point in time based on the established data level and on the respective influence, which the data detected at the corresponding time have on uncertainties instantaneously contained in the initial model, includes in each case a determining of the resolution in such a way that a memory size of the data transferred to the control unit is minimized and, at the same time, an information content of the data transferred to the control unit is at least as great as the magnitude of the influence that the data transferred to the control unit should at least have on uncertainties instantaneously contained in the initial model.

To reduce the computing time, the determination of the resolution in this case may further also be discontinued once the memory size in this case is below a threshold value for the memory size.

The resolution is further a spatial resolution, a planar resolution and/or a temporal resolution of the data.

Figure 2:
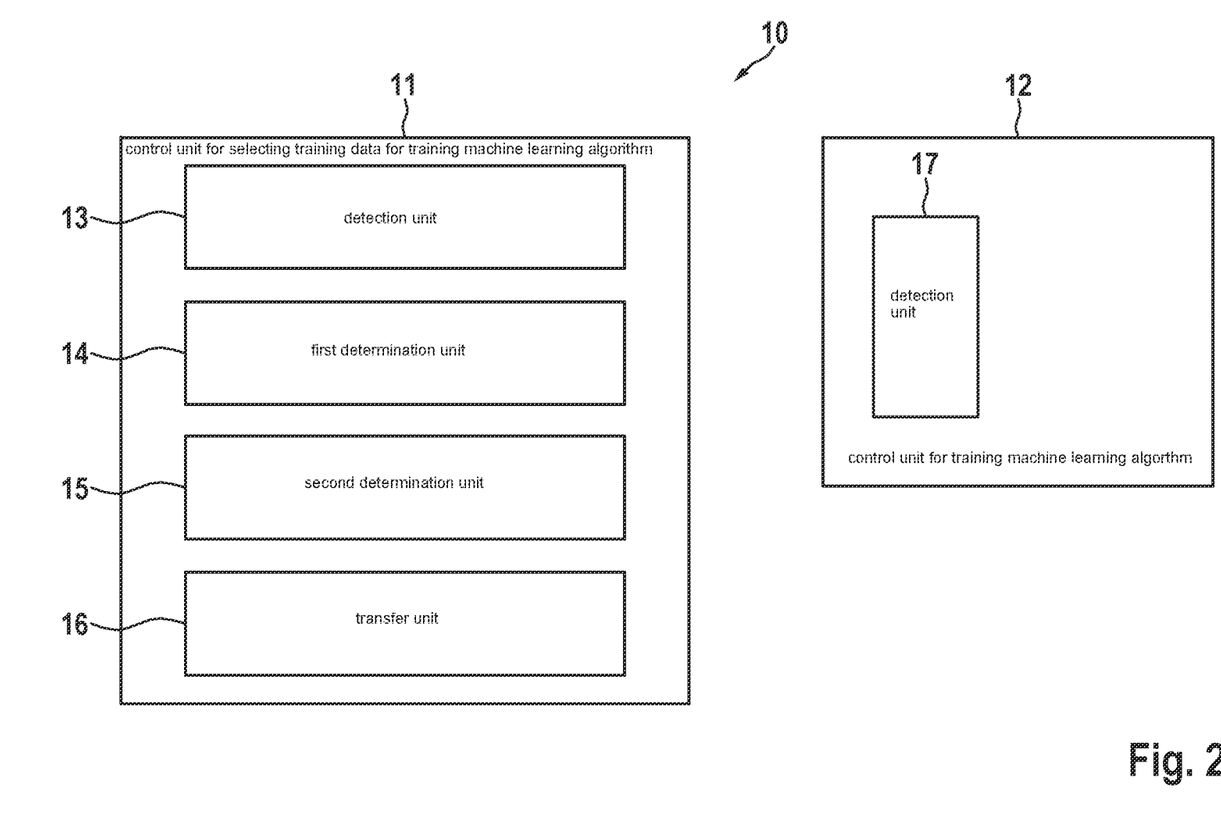
FIG. 2 schematically shows a block diagram of a system for training a machine learning algorithm according to specific embodiments of the present invention.

FIG. 2 schematically shows a block diagram of a system 10 for training a machine learning algorithm according to specific embodiments of the present invention.

The machine learning algorithm in this case is, in turn, an algorithm for controlling at least one controllable system, the machine learning algorithm assigning possible output values to input values, the machine learning algorithm including for each assignment of an input value to an output value an uncertainty, the uncertainty indicating in each case how well the assignment of the input value to the possible output value has previously been trained.

As shown in FIG. 2, system 10 in this case includes a control unit for selecting training data for training the machine learning algorithm 11 and a control unit for training machine learning algorithm 12, the control unit for training machine learning algorithm 12 being designed to pre-train the machine learning algorithm based on initially collected data in order to obtain an initial model and to retrain the initial model based on data obtained from the control unit for selecting training data for training a machine learning algorithm 11 for controlling a controllable system.

In this case, the control unit for selecting training data for training machine learning algorithm 11 may, in particular, be designed in the at least one controllable system itself or be integrated into the latter.

The control unit for training machine learning algorithm 12 may further also be designed in the at least one controllable system itself or else also be designed in a backend, if control unit 12 is designed in the backend, a prediction model about what is to be expected in the near future in terms of data and/or with which resolution they are to be transferred in the future, the prediction model, in turn, being capable of being a machine learning algorithm taught during the operation of the at least one controllable system, and the prediction model being capable of being fixed or adaptive. If the prediction model in this case is adaptive, a probabilistic prediction model is further required, with the aid of which corresponding uncertainties may be assessed, for example, at which point in time a corresponding information content in the data is to be expected. Control unit 12 in this case may predict, for example, based on the prediction model, which data are able to be obtained in the near future and accordingly communicated to control unit 11, on the basis of which of these data expected in the near future, uncertainties instantaneously contained in the initial model may be reduced.

According to the specific embodiments of FIG. 2, the at least one controllable system in this case is further an autonomously driving motor vehicle, or functions relating to the operation of an autonomously driving motor vehicle, in particular, speed setting, gear selection or temperature regulation.

As further shown in FIG. 2, the control unit for selecting training data for training a machine learning algorithm 11 in this case includes a detection unit 13, which is designed to detect data at a plurality of points in time during an operation of the at least one controllable system, which characterizes in each case an instantaneous state of at least one controllable system, a first determination unit 14, which is designed, for each point in time of the plurality of points in time, to determine in each case an influence, which the data detected at the corresponding point in time have on uncertainties instantaneously contained in the initial model, a second determination unit 15, which is designed, for each point in time of the plurality of points in time, to determine a resolution of the data detected at the corresponding point in time based on an established data level and on the respective influence, which the data detected at the corresponding point in time have on the uncertainties instantaneously contained in the initial model, and a transfer unit 16, which is designed for each point in time of the plurality of points in time to transfer data detected at the corresponding point in time to a control unit for training the machine learning algorithm 12 based on the or with the corresponding determined resolution.

The detection unit and the transfer unit in this case may, for example, be integrated into a transceiver. The first determination unit and the second determination unit may further both be implemented, in each case, for example, based on code stored in a memory and executable by a processor.

In addition, the control unit for training the machine learning algorithm 12 also includes a detection unit 17, which is designed to detect or to receive the data transferred by transfer unit 16.

The individual data in this case may, for example, be detected by corresponding sensors or corresponding control units designed in the at least one controllable system or in the autonomously driving motor vehicle.

According to the specific embodiments of FIG. 2, the initial model is, in turn, a Gaussian process.

In addition, the established data level, in turn, indicates how great an influence of the data transferred to the control unit should at least be on uncertainties instantaneously contained in the initial model.

According to the specific embodiments of FIG. 2, second determination unit 15 is further designed in such a way as to determine for each point in time of the plurality of points in time the resolution of the data detected at the corresponding point in time in such a way that a memory size of the data to be transferred to the control unit is minimized and, at the same time, an information content of the data transferred to the control unit for training machine learning algorithm 12 is at least as great as the magnitude of the influence that the data transferred to the control unit should at least have on uncertainties instantaneously contained in the initial model. Thus, second determination unit 15 is, in turn, designed to ascertain the resolution based in each case on a limited optimization problem.

What is claimed is:

1. A method for training a machine learning algorithm, the machine learning algorithm being an algorithm for controlling at least one controllable system, the machine learning algorithm configured to assign possible output values to input values, the machine learning algorithm including, for each assignment of an input value to an output value, an uncertainty, each uncertainty indicating a quality of the assignment of the input value to the possible output value, the method comprising the following steps:
   training the machine learning algorithm based on data initially collected by a control unit for training the machine learning algorithm in order to obtain an initial model;
   detecting data characterizing an instantaneous state of the at least one controllable system at each of a plurality of points in time during an operation of the at least one controllable system;
   determining, for each point in time of the plurality of points in time, a respective influence, which the data characterizing an instantaneous state of the at least one controllable system detected at the point in time have on uncertainties already contained in the initial model;
   determining, for each point in time of the plurality of points in time, a corresponding resolution of the data detected at the point in time, based on an established data level and on the respective influence, which the data detected at the point in time have on the uncertainties already contained in the initial model;
   transferring, for each point in time of the plurality of points in time, the data detected at the point in time to the control unit based on the corresponding determined resolution; and
   training the initial model by the control unit based on the data transferred for each point in time of the plurality of points in time to the control unit.

2. The method as recited in claim 1, wherein the initial model is a Gaussian process.

3. The method as recited in claim 1, wherein the established data level indicates how great an influence of the data transferred to the control unit should at least be on the uncertainties already contained in the initial model.

4. The method as recited in claim 3, wherein the step of determining for each point in time of the plurality of points in time a respective resolution of the data detected at the point in time, based on an established data level and the respective influence which the data detected at the point in time have on the uncertainties already contained in the initial model, further includes the following step:
   determining the corresponding resolution in such a way that a memory size of the data to be transferred to the control unit is minimized and, at the same time, an information content of the data transferred to the control unit is at least as great as a magnitude of the influence that the data transferred to the control unit should at least have on the uncertainties already contained in the initial model.

5. The method as recited in claim 1, wherein the respective resolution of the data is a spatial resolution of the data or a planar resolution of the data or a temporal resolution of the data.

6. A method for controlling at least one controllable system, the method comprising the following steps:
   training a machine learning algorithm for controlling the at least one controllable system by:
      training the machine learning algorithm based on data initially collected by a control unit for training the machine learning algorithm in order to obtain an initial model,
      detecting data characterizing an instantaneous state of the at least one controllable system at each of a plurality of points in time during an operation of the at least one controllable system,
      determining, for each point in time of the plurality of points in time, a respective influence, which the data detected at the point in time have on uncertainties already contained in the initial model,
      determining, for each point in time of the plurality of points in time, a corresponding resolution of the data detected at the point in time, based on an established data level and on the respective influence, which the data detected at the point in time have on the uncertainties already contained in the initial model,
      transferring, for each point in time of the plurality of points in time, the data detected at the point in time to the control unit based on the corresponding determined resolution, and
      training the initial model by the control unit based on the data transferred for each point in time of the plurality of points in time to the control unit;
   controlling the at least one controllable system based on the trained machine learning algorithm.

7. A control unit for selecting training data for training a machine learning algorithm, the machine learning algorithm being an algorithm for controlling at least one controllable system, the machine learning algorithm configured to assign possible output values to input values, the machine learning algorithm including, for each assignment of an input value to an output value, an uncertainty, each uncertainty indicating a quality of the assignment of the input value to the possible output value, and the machine learning algorithm having been pre-trained based on initially collected data in order to obtain an initial model, the control unit comprising:
- a detection unit configured to detect data at a plurality of points in time during an operation of the at least one controllable system, which characterize in each case an instantaneous state of at least one controllable system;
- a first determination unit configured to determine, for each point in time of the plurality of points in time, a respective influence, which the data detected at the point in time have on uncertainties already contained in the initial model;
- a second determination unit configured to determine, for each point in time of the plurality of points in time, a corresponding resolution of the data detected at the corresponding point in time based on an established data level and on the respective influence which the data detected at the point in time have on the uncertainties already contained in the initial model; and
- a transfer unit configured to transfer, for each point in time of the plurality of points in time, the data detected at the point in time to a control unit for training the machine learning algorithm, based on the corresponding determined resolution.

8. The control unit as recited in claim 7, wherein the initial model is a Gaussian process.

9. The control unit as recited in claim 7, wherein the established data level indicates how great an influence of the data transferred to the control unit should at least be on the uncertainties already contained in the initial model.

10. The control unit as recited in claim 8, wherein the second determination unit is configured to determine, for each point in time of the plurality of points in time, the corresponding resolution in such a way that a memory size of the data transferred to the control unit for training the machine learning algorithm is minimized and, at the same time, the information content of the data transferred to the control unit for training the machine learning algorithm is at least as great as a magnitude of the respective influence that the data transferred to the control unit for training the machine learning algorithm should at least have on the uncertainties already contained in the initial model.

11. The control unit as recited in claim 7, wherein the respective resolution of the data is a spatial resolution of the data, or a planar resolution of the data, or a temporal resolution of the data.

12. A system for training a machine learning algorithm, the machine learning algorithm being an algorithm for controlling at least one controllable system, the machine learning algorithm being configured to assign possible output values to input values, the machine learning algorithm including for each assignment of an input value to an output value an uncertainty, each uncertainty indicating in a quality of the assignment of the input value to the possible output value, the system comprising:
- a first control unit for selecting training data for training the machine learning algorithm, the first control unit including:
  - a detection unit configured to detect data at a plurality of points in time during an operation of the at least one controllable system, which characterize in each case an instantaneous state of at least one controllable system,
  - a first determination unit configured to determine, for each point in time of the plurality of points in time, a respective influence, which the data detected at the point in time have on uncertainties already contained in the initial model,
  - a second determination unit configured to determine, for each point in time of the plurality of points in time, a corresponding resolution of the data detected at the corresponding point in time based on an established data level and on the respective influence which the data detected at the point in time have on the uncertainties already contained in the initial model, and
  - a transfer unit configured to transfer, for each point in time of the plurality of points in time, the data detected at the point in time to a second control unit for training the machine learning algorithm, based on the corresponding determined resolution; and
- the second control unit configured to train the machine learning algorithm, the second control unit configured to train the machine learning algorithm being configured to pre-train the machine learning algorithm based on initially collected data in order to obtain an initial model, and to train the initial model based on data obtained from the first control unit for selecting training data for training the machine learning algorithm.

13. A system for controlling a controllable system, the system comprising:
- the at least one controllable system; and
- a first control unit for controlling the at least one controllable system based on a machine learning algorithm trained by a system for training a machine learning algorithm, the system for training the machine learning algorithm including:
  - a second control unit for selecting training data for training the machine learning algorithm, the second control unit including:
    - a detection unit configured to detect data at a plurality of points in time during an operation of the at least one controllable system, which characterize in each case an instantaneous state of at least one controllable system,
    - a first determination unit configured to determine, for each point in time of the plurality of points in time, a respective influence, which the data detected at the point in time have on uncertainties already contained in the initial model,
    - a second determination unit configured to determine, for each point in time of the plurality of points in time, a corresponding resolution of the data detected at the corresponding point in time based on an established data level and on the respective influence which the data detected at the point in time have on uncertainties already contained in the initial model, and
    - a transfer unit configured to transfer, for each point in time of the plurality of points in time, the data detected at the point in time to a third control unit for training the machine learning algorithm, based on the corresponding determined resolution; and
  - the third control unit configured to train the machine learning algorithm, the third control unit configured to train the machine learning algorithm being configured to pre-train the machine learning algorithm based on initially collected data in order to obtain an initial model, and to train the initial model based on data transferred to it by the second control unit for selecting training data for training the machine learning algorithm.

14. The system as recited in claim 13, wherein the at least one controllable system is an autonomously driving motor vehicle.

\* \* \* \* \*